INVENTOR
FRANK F. OLLAR

BY Cullen, Sloman, & Cantor
ATTORNEYS

Aug. 18, 1970     F. F. OLLAR     3,524,260
GUILLOTINE GAUGE
Filed July 3, 1968     2 Sheets-Sheet 2
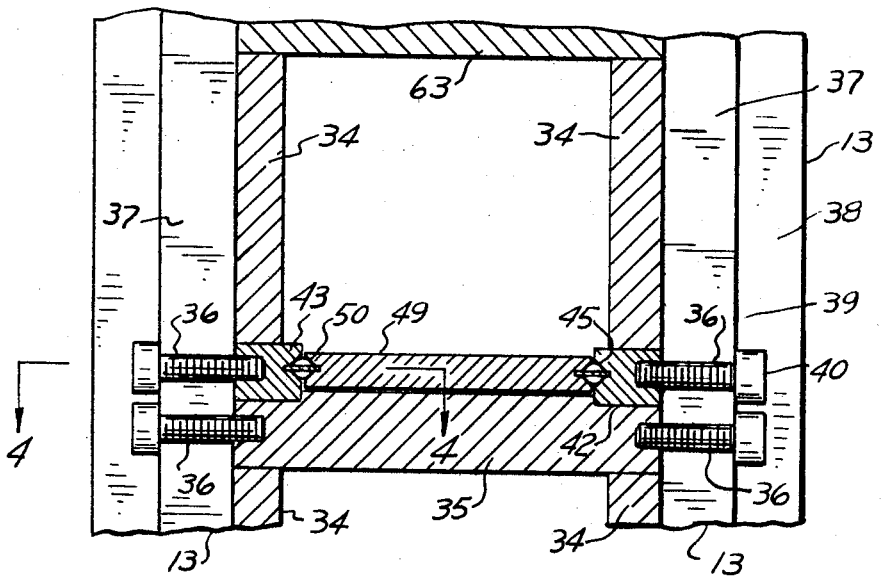
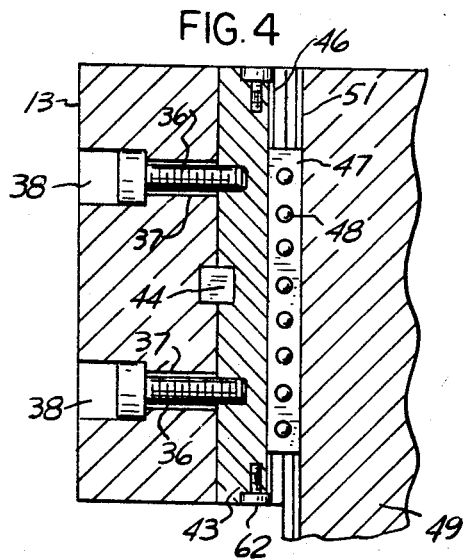
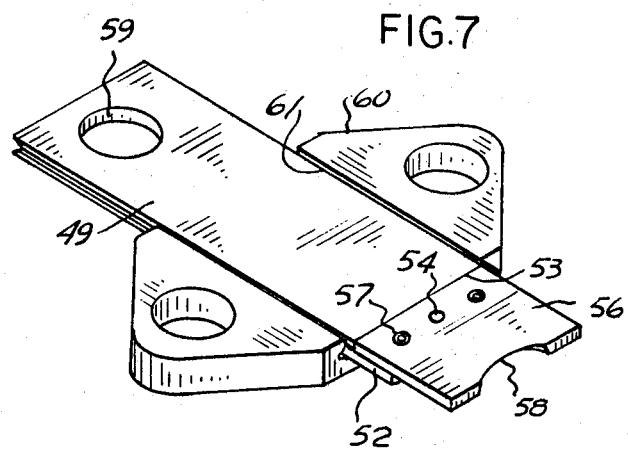
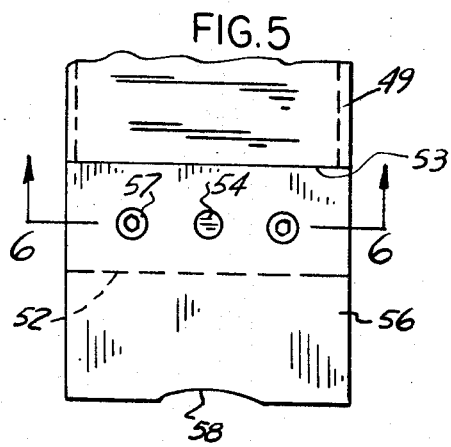
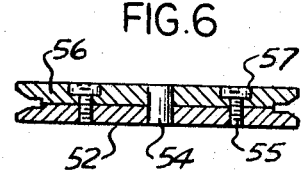
INVENTOR
FRANK  F. OLLAR
BY *Cullen, Sloman, & Cantor*
ATTORNEYS United States Patent Office 3,524,260
Patented Aug. 18, 1970

3,524,260
GUILLOTINE GAUGE
Frank F. Ollar, 36051 Vargo, Livonia, Mich. 48152
Filed July 3, 1968, Ser. No. 742,222
Int. Cl. G01b 5/20
U.S. Cl. 33—174
9 Claims

ABSTRACT OF THE DISCLOSURE

A guillotine gauge which includes, upon a base with means for adjustably supporting a workpiece, opposed pairs of interconnected upright spaced column blocks secured to opposite sides of the base at its opposite ends, and means between each of said pair of end column blocks for supporting at variable heights opposed pairs of gauge blade assemblies movable in horizontal planes for gauging surface portions of a workpiece from its opposite sides, said gauge blade mounting including upright spacers upon said base bearing against said column blocks, horizontal spacer plate bridging said first spacers, bearing against and secured to said column blocks, with a pair of spaced bearing supports mounted on said latter spacer plate bearing against the column blocks and secured thereto and a gauge blade assembly reciprocally mounted between said bearing supports with bearing means interposed; and an improved gauge blade assembly.

Heretofore, in the gauging of irregular surfaces of workpieces, wherein, the contour and shape normally differs from opposite sides and throughout the length thereof, as in the case of impeller blades for illustration, various efforts have been made to efficiently check and gauge surface contour thereof.

It is the object of the present invention to provide an improved guillotine gauge assembly of a very rigid construction which provides upon a base which supports a workpiece intermediate its ends pairs of support columns rigidly interconnected and within which may be positioned oppositely arranged variably adjusted as to height gauge blade assemblies for reciprocal movements and operative engagement with a workpiece supported therebetween.

It is another object of the present invention to provide an improved means by which in a very simple manner gauge blade assemblies may be adjusted as to height for gauging particular points along the surface of the workpiece.

It is another object to provide an improved blade assembly mounting which results in a minimum of friction and provides rigid support and a preloading of the gauge blade assembly.

It is another object to provide an improved gauge blade assembly which includes an elongated holder with a step down blade support defining a shoulder upon said holder and removably mounting and securing upon said blade support a replaceable interchangeable gauge blade.

These and other objects will be seen from the following specification and claims in conjunction with the appended drawings in which:

FIG. 3 is a fragmentary section on an increased scale taken in the direction of arrows 3—3 of FIG. 1.

FIG. 4 is a fragmentary section taken in the direction of arrows 4—4 of FIG. 3.

FIG. 5 is a fragmentary plan view of the gauge blade assembly.

FIG. 6 is a sectional view taken in the direction of arrows 6—6 of FIG. 5.

FIG. 7 is a front perspective view of a modified gauge blade assembly and mounting.

Figure 1:
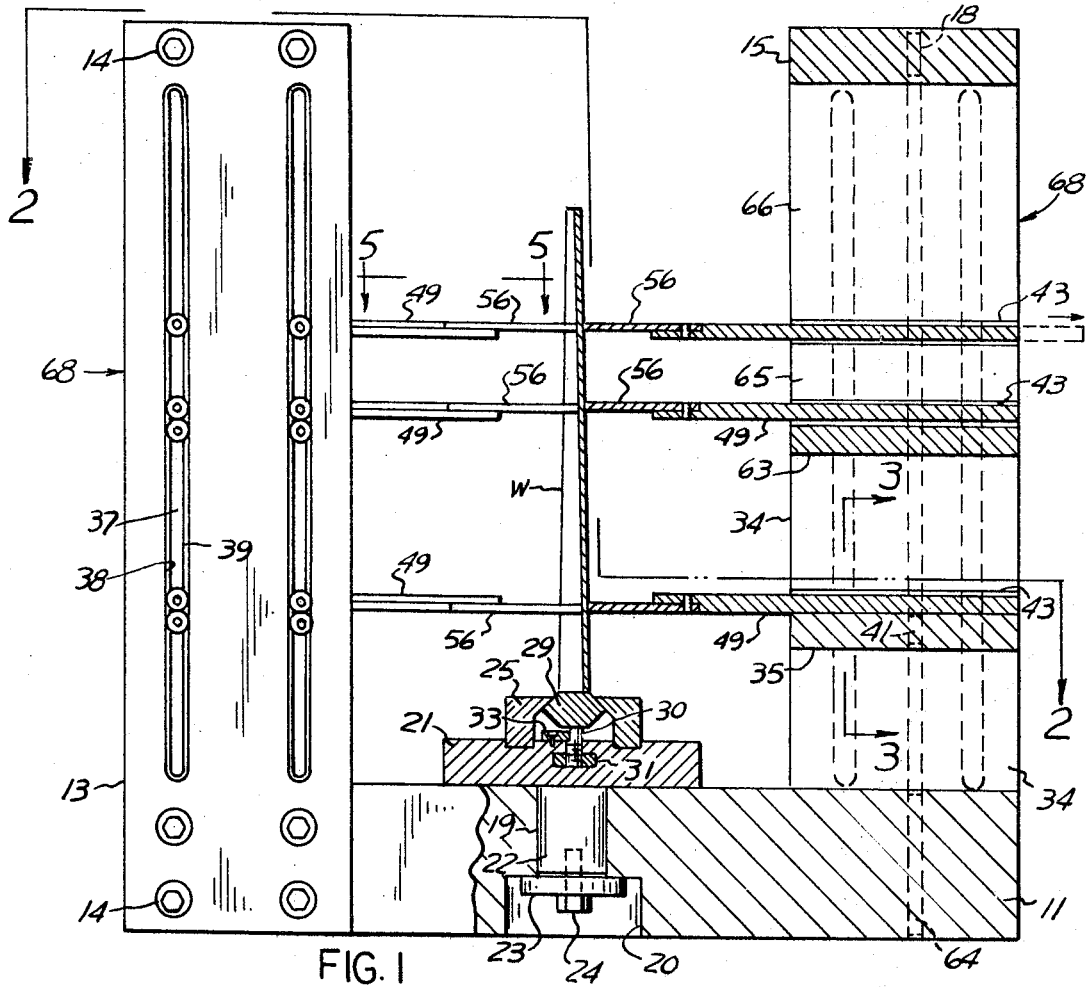
FIG. 1 is a front elevational view of the present guillotine gauge with a portion thereof cut away and sectioned for illustration.

Referring to the drawing the present gauge includes an elongated heavy metallic base 11 of rectangular cross section whose opposite ends are of reduced width as at 12 adapted to receive upon opposite sides of said base at said ends the opposed pairs of upright column blocks 13 fixedly secured to the base by suitable fasteners 14.

Top spacer block 15 is interposed between the upper ends of the column blocks and secured thereto by suitable fasteners 14.

Upright elongated key slots 16 extend throughout the height of said column blocks and corresponding key slots 17 are provided within top spacer block 15 with short securing keys 18 interposed therebetween.

Intermediate ends of base 11 and its central upright axis there is provided an upright bore 19 and at its lower end a counterbore 20. Work support 21 has a depending shaft 22 which is adjustably positioned within bore 19 and is adjustably and fixedly secured therein by washer 23 and fastener 24 providing a means by which a workpiece W may be correctly oriented at and along generally the central upright axis of the base 11 as best shown in FIG. 1.

Figure 2:
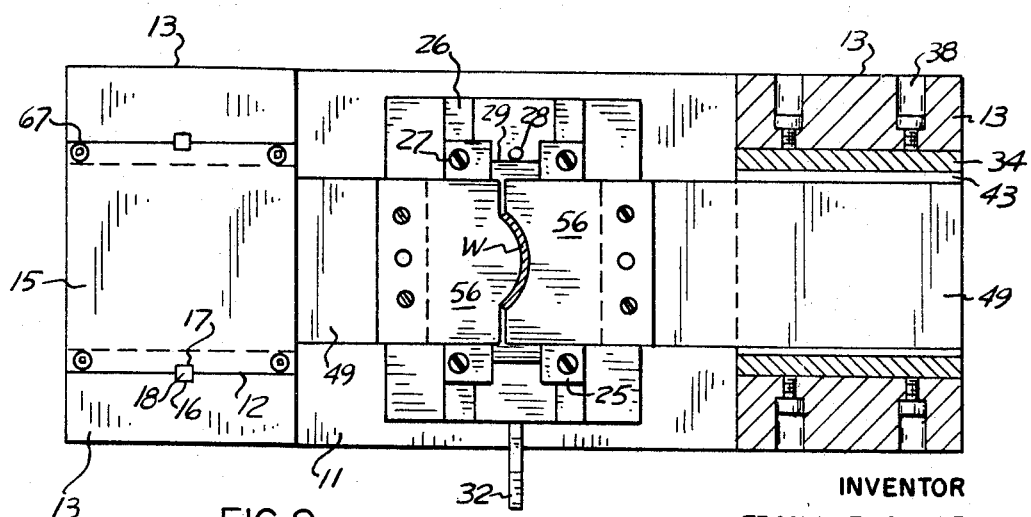
FIG. 2 is a section taken in the direction of arrows 2—2 of FIG. 1.

Opposed pairs of laterally elongated jaws 25 are mounted within the transverse slots 26 of support 21 for transverse adjustment therein and are fixedly secured selectively by fasteners 27, FIG. 2.

Workpiece W is positioned upright with its angularly formed base 29 projected under the opposed jaws 25 and up against the stop pin 28 on support 21 and bearing upon the locking screw 30 which is compressibly and longitudinally adjustable against the under surface of support 29 relative to the jaws 25 for firmly securing the workpiece in position for gauging.

For this purpose there is provided within a corresponding bore within support 21 a rotative nut 31, which is manually rotatable by means of a laterally extending handle 32 which projects outwardly of work support 21 in a corresponding and suitable slot which will permit limited rotary movements of said handle in a horizontal plane. Securing screw 30 is fixed against rotation by means of the key 33 which is fixedly secured to the work support 21 and bears against screw 30. Accordingly, upon manual rotation in an arc of the handle 32 and nut 31 which is restrained against longitudinal movement, securing screw 30 is adapted to move axially for operative retaining engagement with the undersurface of the workpiece support base 29 to provide a means of simply clamping the workpiece in position for the gauging operation.

Within each pair of column blocks 13 at the respective ends of the base there are provided symmetrically arranged gauge blade assemblies such as shown at 49 including gauge blades 56 having a predetermined contour 58 adapted for operative engagement relative to opposing surface portions of the workpiece W.

The gauging surfaces 58 of the said blades 56 are predetermined corresponding to the desired exterior shape of portions of the workpiece at predetermined points along its length or height; and these gauge blade assemblies 49–56 are adjustably mounted for movement in horizontal planes to thus engage opposite sides of the workpiece.

The present invention is particularly directed to the means by which the gauge blade assemblies may be guidably mounted and adjustably mounted as to height within the respective column support assemblies.

One such support is hereafter described, it being understood that the opposing supports for a particular pair of opposed gauge blade assemblies are normally symmetrical so that the workpiece is gauged from its opposite sides by longitudinal and manual movement of the gauge blade assemblies inwardly until their gauging surfaces 58 bear against the workpiece. As is normal practice in gauging of this type the outer end portions of the gauge blade assemblies will be in normal registry with the outer reference edges 68 of the respective column blocks if the workpiece has been constructed according to a predetermined pattern within the range predetermined.

A pair of upright spacers 34 are loosely mounted upon base 11 and bear against the interior surface of column blocks 13. Horizontally disposed spacer plate 35 spans spacers 34, bears against the respective column blocks 13 and is fixedly secured thereto by fasteners 36. Since the height of the spacers 34 may be modified depending upon the gauging job and thus the spacers 34 are replaceable, it is desirable that a means be provided to accommodate the fasteners 36. For this purpose there is provided within and through column blocks 13 the opposed pairs of spaced upright elongated slots 37 which at the outer portion terminate in the enlarged or wider slots at 38 to define an adjacent shoulder 39 against which retainingly register the heads of a fastener 36. By this construction fasteners 36 may be adjusted so as to register with the corresponding height of the spacer plate 35 depending upon the height of the spacers 34, it being understood that the spacer plate 35 already has threaded apertures in its opposite ends to receive said fasteners.

Keys 41, FIG. 1 are nested within the corresponding upright key slots in spacer plate 35 and the opposed key slots 16 of the column block to provide an improved interlock between the respective parts.

In one form of the present invention the upper surface of the spacer plate 35 is slotted at its opposite sides at 42 and supports and receives therein the respective horizontally elongated bearing supports 43 which engage interior surface portions of the column block 13 and are further secured thereto by fasteners 40 in the manner above described. Here also, additional keys 44, FIG. 4 extend through corresponding key slots in the bearing supports 43 and into the corresponding column block slots 16 for improved interlock of the respective parts.

Within the inner surfaces of each of the bearing supports 43 there is provided the opposed V-channels 45 which terminate in the opposed elongated slots 46 adapted to receive therein ball retainer plates 47 and associated balls 48 which cooperatively bear against the corresponding V-channels 50 within the blade holders 49 as best shown in FIG. 3.

In the illustrative embodiment of the present invention the blade holder 49 is interposed between respective balls 50 in compression in a preload arrangement which is provided due to the fact that the spacing between the rolls of balls 50 is slightly less than the maximum effective width of the blade holder 49. This oversize is only approximately .0005 inch but provides a means of preloading the blade support 49 and to assure against any wobbling in the event of ultimate wear of the respective parts.

It is noted furthermore that the blade assembly 49 has its sole contact only at its edges with respect to the balls 48 and is spaced above spacer plate 35 to reduce frictional forces and at the same time to provide an effective snug and rigid mounting for the blade assembly which also provides freedom for longitudinal and reciprocal movements for the gauging operations.

The corresponding outer edges of the blade support 49, at the base of the said channels 50 have the additional slots 51 to cooperatively receive edge portions of the ball retainer plate 47. Plate retainer screws 62 are threaded into bearing support 43 at its opposite ends to prevent accidental dislodgement or removal of the bearing retainer plates 47 on reciprocal movements of the guillotine gauge assembly 49 as shown in FIG. 4.

An improved gauge blade assembly is provided as shown in FIG. 7 for illustration and which includes elongated blade holder 49, and at one end having a stepped down blade support 52 defining the stop shoulder 53. A removable, replaceable and interchangeable gauge blade 56 with preformed bearing and gauging surface 58 is removably mounted upon blade support 52 snugly against the stop shoulder 53 and fixedly secured thereto. This securing is achieved in the illustrative embodiment of the present invention by means of a fixed dowel 54 which is secured to and projects from blade support 52 snugly into a corresponding aperture within the blade 56. Additional socket headed fasteners 57 extend through corresponding apertures in blade 56 and are threaded down into corresponding apertures within blade support 52.

By this construction, when a particular gauge 56 wears to the extent that replacement is required, there is no need to remove the complete gauge blade assembly but on the other hand this gauge blade element 56 may be easily removed merely by loosening a pair of fasteners 57 and another blade instantly replaced of the same bearing contour 58 or modified as desired for a particular job. Thus, it is not necessary in different jobs to change the gauge support or blade holder 49 but only to replace the blades themselves in the manner shown.

In the illustrative form of the present invention a suitable bearing means is interposed between the blade holders 49 and the corresponding bearing supports 43. These may be balls or they could be roller bearings as desired or other suitable bearing means.

The blade holders 49 have projected through one end thereof apertures 59 providing finger holes for manual engagement with the respective blade holders for reciprocating the same during the gauging operation.

A modified bearing support shown at 60, FIG. 7 is in the form of a plate having a transverse slot 61 across its upper surface within which is slidably nested and movably mounted the blade holder 49 hereinbefore described, which includes in the preferred embodiment a removable, replaceable and interchangeable guillotine blade element 56.

The mounting of the blade holder 49 is exactly the same as above described with respect to FIG. 3 employing a bearing means which includes opposed V-shaped channels in the longitudinal and outer edges of the blade holder 49 and corresponding walls of the support 60 within which are nested the ball bearing assemblies 48 with plates 47 in a manner shown in detail, also in FIG. 4, and not repeated. This is essentially understood that the blade holder 49 is movably mounted upon the bearing support 60 with a minimum of friction but at the same time with a snug overload mounting to prevent wobbling and to minimize wear and to accommodate possible future wear for improved accuracy.

The blade holder and associated blade are so constructed and so mounted that the sole engagement of said blade holder with respect to the support 60 is with and between the bearing support or balls 48 and otherwise spaced at its adjacent edges and surfaces from support 60.

In completing the assembly of spacers and spacer plates such as shown in FIG. 3, and mounted upon the bearing supports 43 are an additional pair of spaced spacers 34 which may be of the same or different heights of the first mentioned spacers 34 thereunder, which also bear against the column blocks 13 and at their upper ends are bridged by the spacer plate 63, which may be similar to spacer plate 35 or may be of a different dimension and which also is keyed to the column blocks in the manner above described and fixedly secured thereto as by the fasteners 36.

The spacer plate 63 as shown in FIG. 1, mounts the additional pair of spaced bearing supports 43 which mount the additional blade holders 49. Above the said additional bearing supports 43 and against the column blocks 13 are an additional pair of symmetrical spacers 65, of reduced height depending upon the particular gauging elevation desired and resting upon the said spacer plate 65 are the additional bearing supports 43. In each case the spacer 65 and the corresponding bearing support 63 are keyed by individual keys which extend within corresponding apertures in the corresponding spacer and bearing support and the adjacent elongated column block key slot 16 to provide an improved interlock. The construction is completed by the additional pair of symmetrical spacers 66 which bear upon the last mentioned bearing supports 43 and extend up to and snugly engage under top spacer block 15 to thus provide a rigid assembly. In this connection, additional fasteners 67, FIG. 2, project down through spacer block 15 and into upper end portions of the last mentioned spacer 66 to thus complete and provide the rigid assembly desired.

Having described my invention, reference should now be had to the following claims.

I claim:

1. A guillotine gauge comprising an elongated base having a central upright axis; an adjustable means secured to said base in registry with said axis for supporting a workpiece along said axis; opposed pairs of interconnected upright spaced column blocks secured to opposite sides of said base at its opposite ends; and a means for mounting a guillotine gauge blade between each pair of column blocks; each said means including a symmetrical pair of upright spacers bearing against each column block; a horizontally disposed spacer plate mounted upon said spacers bearing against said column blocks and fixedly secured thereto; spaced horizontally disposed bearing supports mounted upon said spacer plate, bearing against said column blocks and secured thereto; a horizontally disposed guillotine blade assembly interposed and retained between said bearing supports and spaced from said spacer plate; and bearing means interposed between said blade assembly and bearing supports for slidably mounting said blade assembly for longitudinal reciprocal movements relative to said workpiece for operative gauging engagement therewith.

2. In the gauge of claim 1, there being a pair of coplanar oppositely movable gauge blade assemblies adapted to register with opposite sides of said workpiece.

3. In the gauge of claim 1, said bearing means including a series of balls nested within opposed V-grooves in said bearing supports and blade assembly.

4. In the gauge of claim 1, said bearing means including a series of balls nested within opposed V-grooves in said bearing supports and blade assembly, the spacing between the rows of balls being less than the width of the blade assembly to provide a preload mounting thereof.

5. In the gauge of claim 1, each blade assembly comprising an elongated blade holder having at one end a stepped down blade support and defining a stop shoulder; and a removable replaceable interchangeable gauge blade mounted on said blade support bearing against said shoulder and secured thereto.

6. In the gauge of claim 1, each blade assembly comprising an elongated blade holder having at one end a stepped down blade support and defining a stop shoulder; and a removable replaceable interchangeable gauge blade mounted on said blade support bearing against said shoulder and secured thereto, said securing including a dowel projecting from said blade support extending into said blade; and fasteners extending through said blade and threaded into said blade support.

7. In the gauge of claim 1, there being an upright key slot within the inner surfaces of said column blocks, and corresponding key slots in said spacer plates and bearing supports; and keys respectively interposed and extending between said key slots.

8. In the gauge of claim 1, there being upright spaced elongated slots extending through said column blocks, each slot adjacent the outer surface of said column block being widened to provide an intermediate shoulder; the securing of said spacer plates and bearing supports including headed bolts adjustably extending through said slots and threaded into said spacer plates and bearing supports with their heads retainably bearing against said shoulders.

9. In the gauge of claim 1, and additional pairs of different dimension spacers, spacer plates, and associated bearing supports for supporting and adjustably mounting additional pairs of gauge blade assemblies, at varying heights of said column blocks and arranged throughout the height of said column blocks providing a rigid assembly.

References Cited

UNITED STATES PATENTS

| | | |
|---|---|---|
| 2,709,854 | 6/1955 | Price. |
| 2,879,602 | 3/1959 | Powers. |
| 3,296,704 | 1/1967 | Zajkowski. |
| 3,299,516 | 1/1967 | Reef. |

SAMUEL S. MATTHEWS, Primary Examiner